United States Patent [19]

Gilmour

[11] 4,088,978
[45] May 9, 1978

[54] SYNTHETIC APERTURE SIDE-LOOKING SONAR SYSTEM

[75] Inventor: George A. Gilmour, Severna Park, Md.

[73] Assignee: Westinghouse Electric Corp., Pittsburgh, Pa.

[21] Appl. No.: 727,195

[22] Filed: Sep. 27, 1976

[51] Int. Cl.² .............................................. G01S 9/66
[52] U.S. Cl. ................................. 340/3 R; 340/3 T; 343/5 CM
[58] Field of Search ........ 343/5 CM; 340/3 R, 5 MP, 340/3 T

[56] References Cited

U.S. PATENT DOCUMENTS

| | | | |
|---|---|---|---|
| 3,121,868 | 2/1964 | Hausz et al. | 343/5 CM |
| 3,178,711 | 4/1965 | Case, Jr. | 343/5 CM |
| 3,548,642 | 12/1970 | Flaherty et al. | 340/5 MP X |
| 3,742,436 | 6/1973 | Jones | 340/3 R |

Primary Examiner—Richard A. Farley
Attorney, Agent, or Firm—D. Schron

[57] ABSTRACT

A synthetic aperture side-looking sonar system wherein beam formation takes place in two stages, the first being real aperture multiple beam formation and then coherent addition of real aperture beams to obtain the synthetic aperture improvement.

13 Claims, 11 Drawing Figures

SYNTHETIC APERTURE SIDE-LOOKING SONAR SYSTEM

BACKGROUND OF THE INVENTION

1. Field of the Invention

The invention in general, relates to sonar systems, and particularly to a side-looking multi-beam sonar system.

2. Description of the Prior Art

In side-looking sonar systems apparatus on a carrier vehicle repetitively transmits acoustic pulses (pings) to sonify the target area and energy reflected from adjacent narrow strips on the target area is picked up by a multi-segmented elongated transducer and is portrayed as a line-by-line picture that is a pattern of highlights and shadows analogous to an optically viewed panorama illuminated by side-lighting, with objects outlined in such a way as to permit their identification.

By increasing the area detected and portrayed for each transmitted pulse, the carrier speed and therefore the search or mapping rate is significantly increased. This is accomplished by the use of multiple receiver beams such as described in U.S. Pat. No. 3,950,723. In that Patent, which is herein incorporated by reference, the individual output signals from the plurality of transducer segments of the elongated receiving transducer are processed in such a manner as to form multiple beams and the apparatus is operable such that the focus is electronically varied with range so that any and all returns are constantly in focus.

There is considerable interest in applying the principles of synthetic aperture side-looking radar to side-looking sonar. A synthetic aperture system is based on the generation of an effectively long antenna or receiver transducer by signal processing means rather than by the actual use of a physically long antenna or transducer. In a synthetic aperture side-looking sonar system the receiver transducer is moved to take up sequential positions along a line and during movement acoustic transmissions take place and the reflected energy is evidenced by the transducer segment output signals which are stored. After a predetermined number of sequential pings during the course of travel, all of the stored signals are suitably processed to form one or more synthetic aperture beams each having a higher resolution, due to the longer aperture, than the real aperture beam.

Depending upon the number of transducer segments of the receiver transducer, such system requires a relatively large amount of storage capability and if the apparatus is located on a deep towed vehicle, all of this storage information must be transmitted up the tow cable thus requiring either multiplexing equipment or larger capacity cables.

In addition, although the synthetic aperture sonar provides better resolution, there are situations where resolution can be sacrificed for greater speeds. In the present invention, the apparatus can operate in the real aperture mode as described in the mentioned patent for faster carrier speeds and can additionally be operated in a synthetic aperture mode to obtain greater resolution.

SUMMARY OF THE INVENTION

The present apparatus is a multi-beam side-looking sonar system including an elongated receiver transducer made up of a plurality of transducer segments each providing a respective segment output signal in response to reflected acoustic energy from an acoustic transmission. Circuit means are provided and are responsive to the segment output signals for forming a predetermined plurality of beam signals which are placed into storage. Means are additionally provided for coherently adding both newly formed and previously stored beam signals to obtain resultant beam signals of greater resolution.

DESCRIPTION OF THE PREFERRED EMBODIMENT

Figure 1:
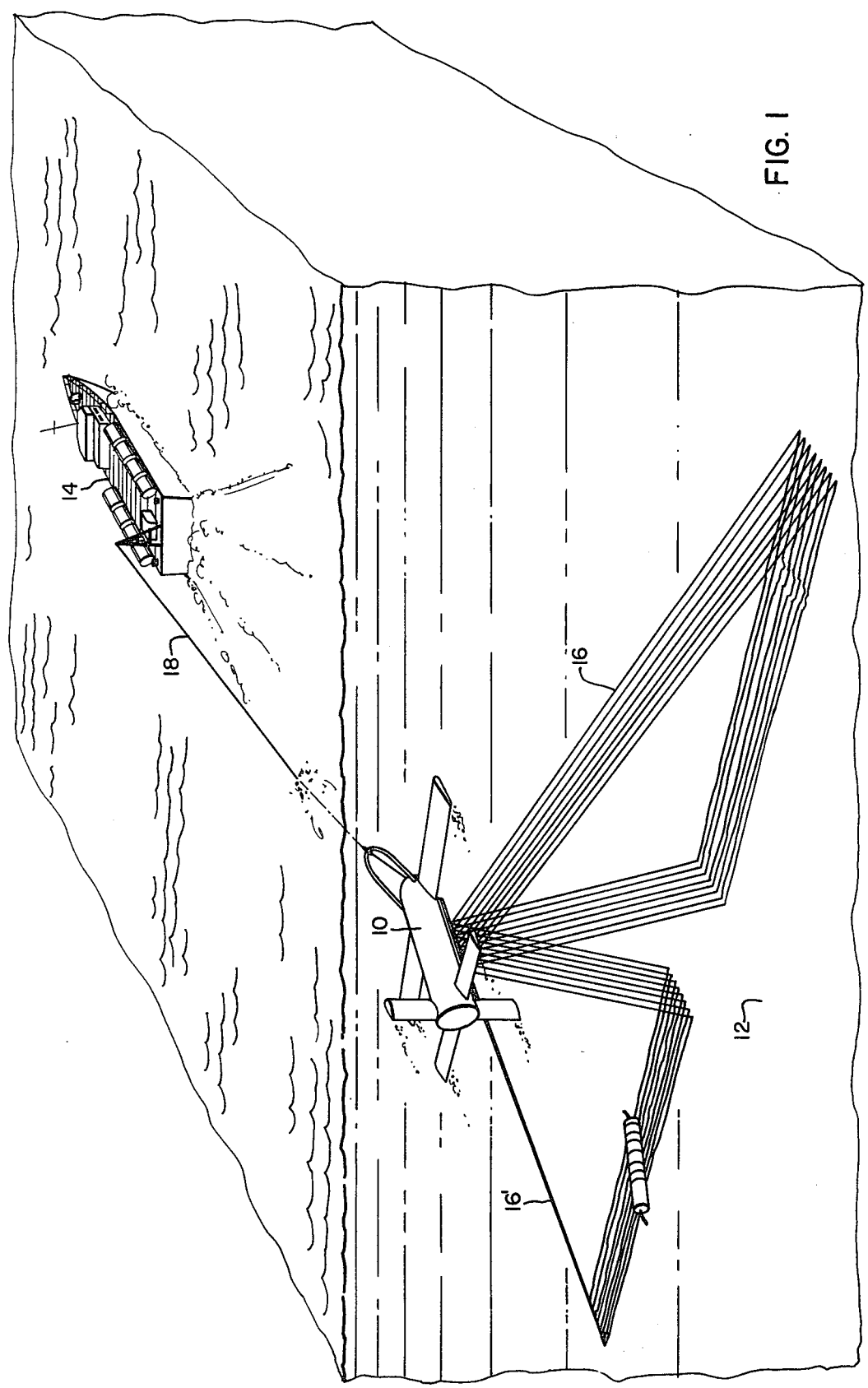
FIG. 1 illustrates a towed carrier multi-beam side-looking sonar system.

In FIG. 1 a multi-beam side-looking sonar system is carried by an underwater carrier vehicle 10 which is towed along a course line over a target area 12 by means of a tow vehicle such as ship 14. In response to each transmission of repetitive acoustic transmissions a plurality of receiver beams is formed for obtaining a side-looking sonar picture of the target area. For greater coverage, the system would generally employ both starboard beams 16 and port beams 16'. The receiver beam signals indicative of the target area are transmitted up the tow cable 18 to display equipment on the towing vehicle 14.

Figure 2:
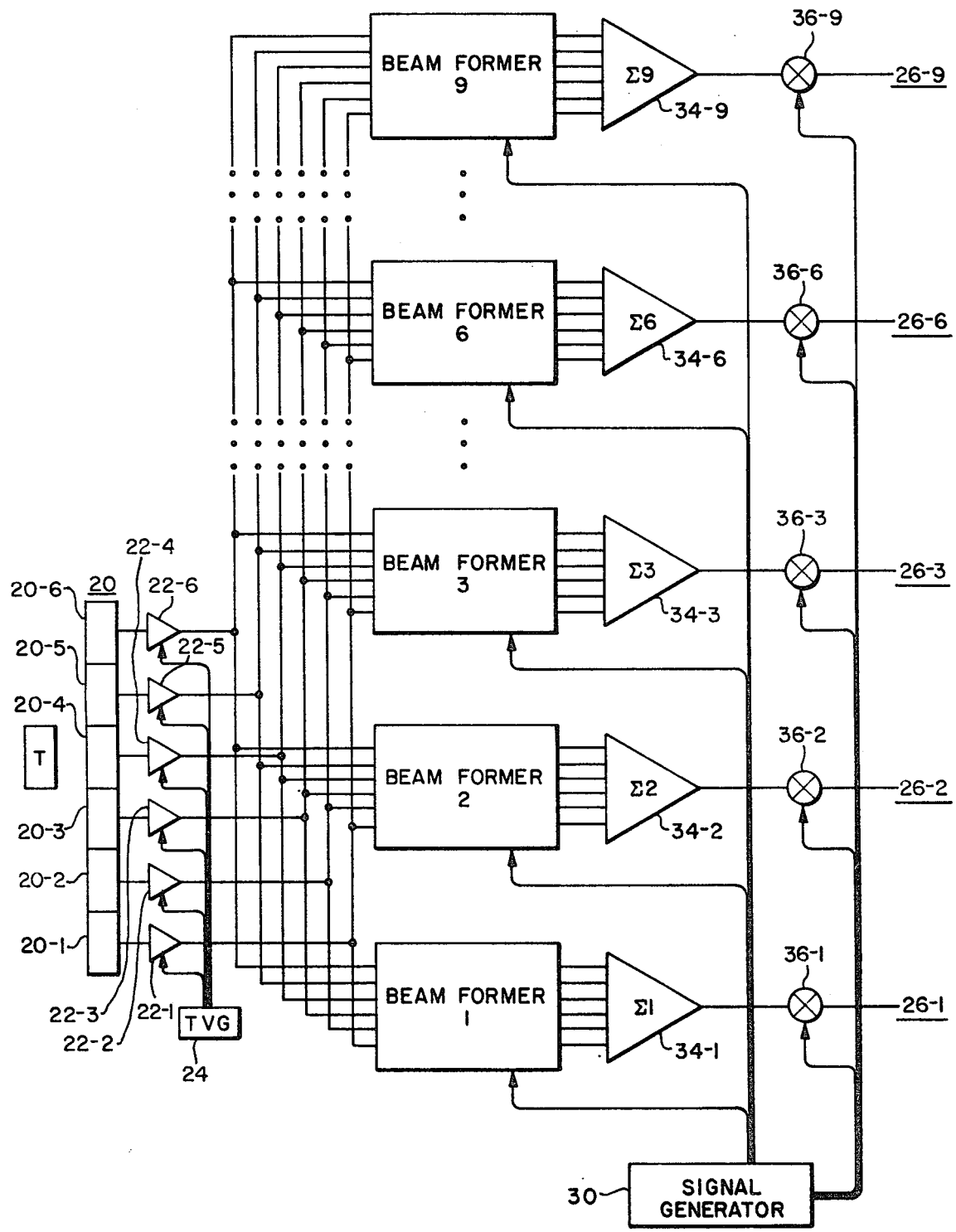
FIG. 2 is a block diagram illustrating a side-looking sonar transducer and the apparatus for forming multiple beams.

In FIG. 2 a side-looking sonar receiver transducer 20 is shown for the purpose of illustration to be divided into six segments 20-1 to 20-6. A transmitter transducer T is shown at the same location as segment 20-4 and when suitably energized will sonify the target area whereby each of the segments 20-1 to 20-6 will provide respective segment output signals in response to reflected acoustic energy from the target area. The segment output signals are amplified in respective amplifiers 22-1 to 22-6 each of which receives a time varying gain signal from TVG generator 24, in a well-known manner.

The plurality of segment output signals, suitably amplified, are then collectively provided to each, of a plurality of beam signal processing channels 26-1 to 26-9, each including a beam former, nine being illustrated by way of example. A signal generator 30 provides properly phased mixing signals to all of the beam formers for modifying the phase of the segment output signals so as basically to provide a plurality of sets of signals with substantially no phase difference between signals of a set. These sets of signals are summed in respective summing circuits 34-1 to 34-9 (which are stages of the beam formers) and thereafter the summed signals are provided to respective synchronous demodulators 36-1 to 36-9, the respective outputs of which represent individual beam signals.

The signal processing is basically the same as that described in the aforementioned patent, however for the present invention the detection of the individual beam signals is slightly modified by the use of synchronous demodulators 36-1 to 36-9 so as to preserve certain phase information required for synthetic aperture processing. The synchronous demodulators are of the well known type which will provide a beam signal having an I (in-phase) component and a Q (quadrature or 90° out-of-phase) component indicative not only of the magnitude of the beam signal but also of its relative phase. Although synchronous demodulation retains both the phase and amplitude information of the incoming signal, only the amplitude information is required in the real aperture mode. The phase information however is additionally required in the synthetic aperture mode in order to coherently add succeeding signals.

The signals provided by the synchronous demodulators are beam signals, which, depending upon the circuitry utilized may be in analog or digital form. These signals are detected and provided as output signals for display purposes. Thus in FIG. 3, the beam signal processing channels 26-1 to 26-9 include respective detectors 40-1 to 40-9 responsive to the synchronous demodulator outputs to provide the proper beam display signals for the side-looking sonar display.

Figure 3:
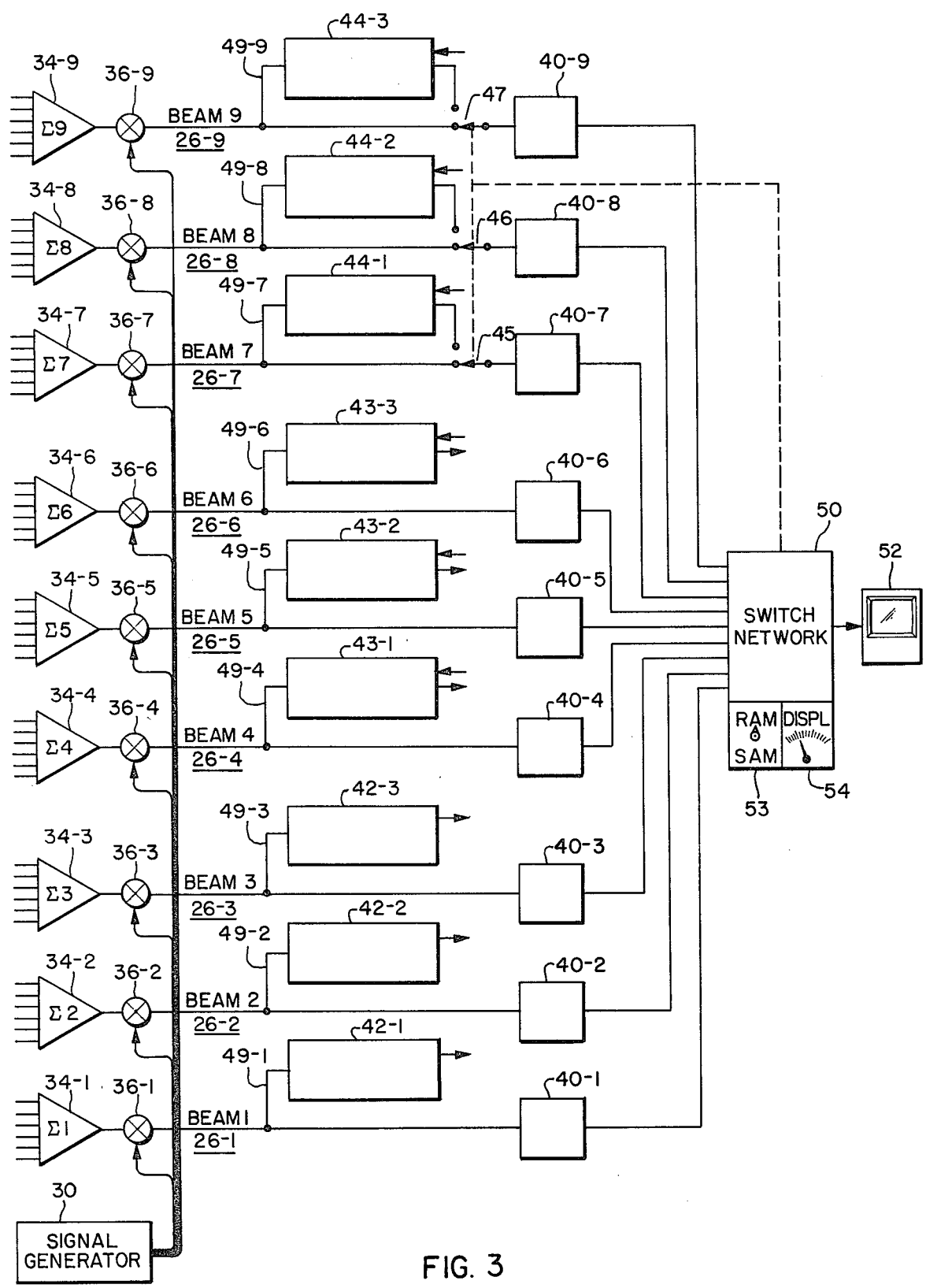
FIG. 3 is a block diagram of apparatus for operation in both the real and synthetic aperture modes.

FIG. 3 additionally shows a plurality of blocks each of which is connected to receive a respective synchronous demodulated beam signal, for operation in the synthetic aperture mode. In the example to be described, the system provides nine real beams and will provide three synthetic aperture beams. Accordingly, the blocks are labeled in three groups of three that is, 42-1, 2 and 3, 43-1, 2 and 3 and 44-1, 2 and 3 with the last three blocks 44-1, 2 and 3 being selectively connectable with detectors 40-7, 40-8 and 40-9 by means of switches 45, 46 and 47 of the mechanical or electronic variety and with all of the blocks being connected to receive beam signals by means of respective leads 49-1 to 49-9 which, although not shown, may include switches.

For selective operation in either the real aperature mode or synthetic aperture mode there is provided a switching network which receives the processed beam signals for presentation on the display 52.

Selection of the real aperture mode RAM or synthetic aperture mode SAM may be accomplished manually by switch selector 53 and when SAM is chosen, the switch network 50 will engage switches 45, 46 and 47 with the synthetic aperture processing group 44-1, 2 and 3.

Selection of the real aperture mode may be accompanied by additional selection of the desired number of beams to be displayed by means of switch selector 54. That is, under certain conditions and depending upon the system design, not all generated beam signals (needed for synthetic aperture beam formation) will be displayed in the real aperture mode.

Figure 4:
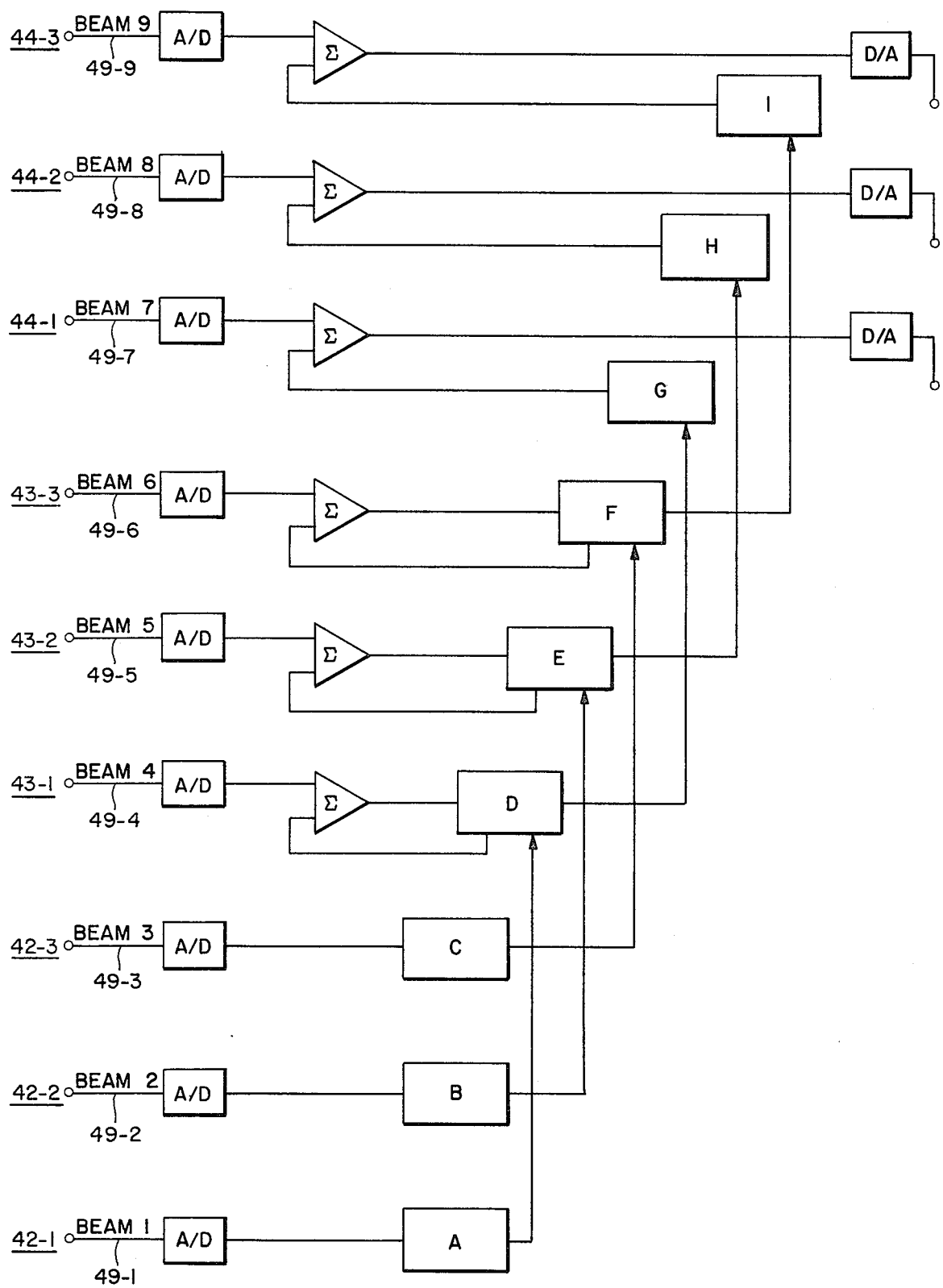
FIG. 4 is a block diagram illustrating some apparatus of FIG. 3 in more detail.
Figure 5:
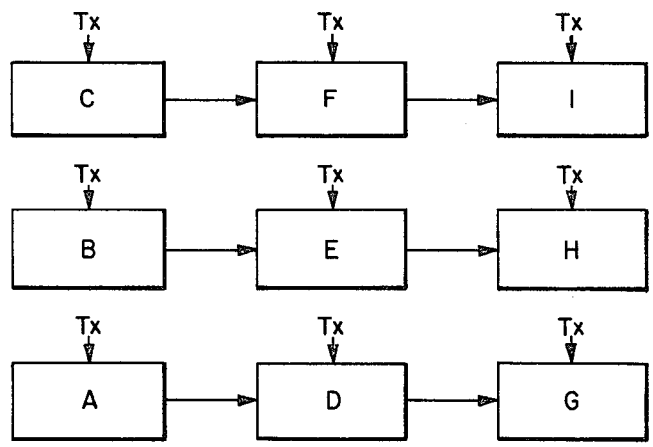
FIG. 5 is a block diagram of the storage units of FIG. 4 illustrating the transfer of data.

The circuit groups 42 to 44 of the beam signal processing channels are illustrated in FIG. 4 and each group includes a respective storage means such as storage registers A to I arranged to transfer information as illustrated in FIG. 5, such that registers A, B and C of the 42 group transfer their contents respectively to registers D, E and F of the 43 group upon each ping (Tx) while registers D, E and F transfer their contents respectively to registers G, H and I of the 44 group.

Referring once again to FIG. 4, the outputs of the synchronous demodulators if in analog form may be converted to digital form with the provision of respective analog-to-digital converters A/D. In response to a transmission, real aperture beams 1, 2 and 3 will be stored in registers A, B and C. Real aperture beams 4, 5 and 6 will be coherently added with the previously formed beams 1, 2 and 3 now in registers D, E and F after the transfer from registers A, B and C. The coherent addition takes place in summers Σ and the results placed back into respective storages D, E and F. The previously stored addition, from registers D, E and F are transferred to registers G, H and I where they are coherently added with real aperture beams 7, 8 and 9 with the final results thereof being converted back to analog form by digital-to-analog converters D/A for presentation as high resolution synthetic aperture beams formed by the coherent addition of real aperture beams.

Figure 6A:
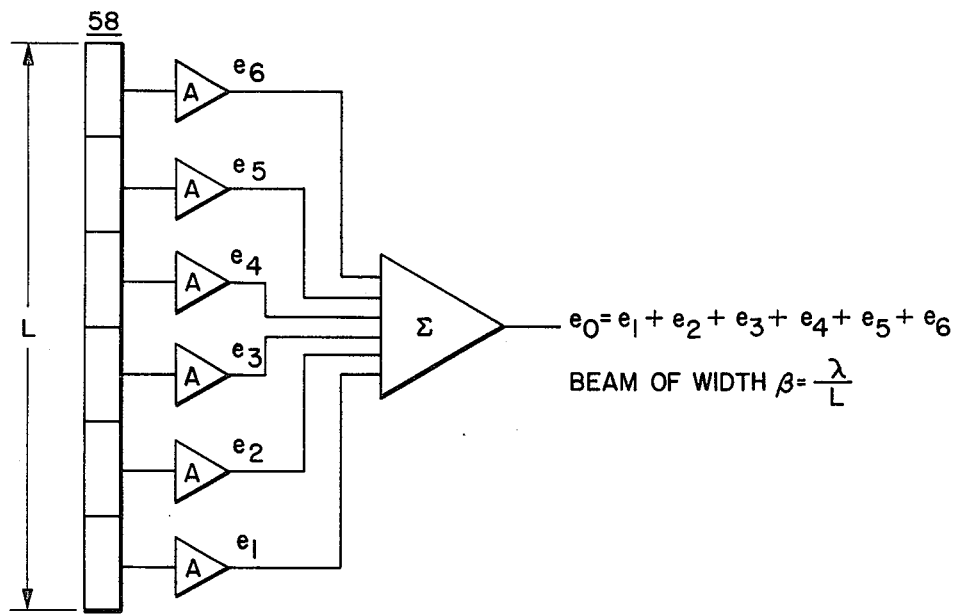
FIGS. 6A and 6B are circuit diagrams illustrating the principle of coherent addition of beam signals.
Figure 6B:
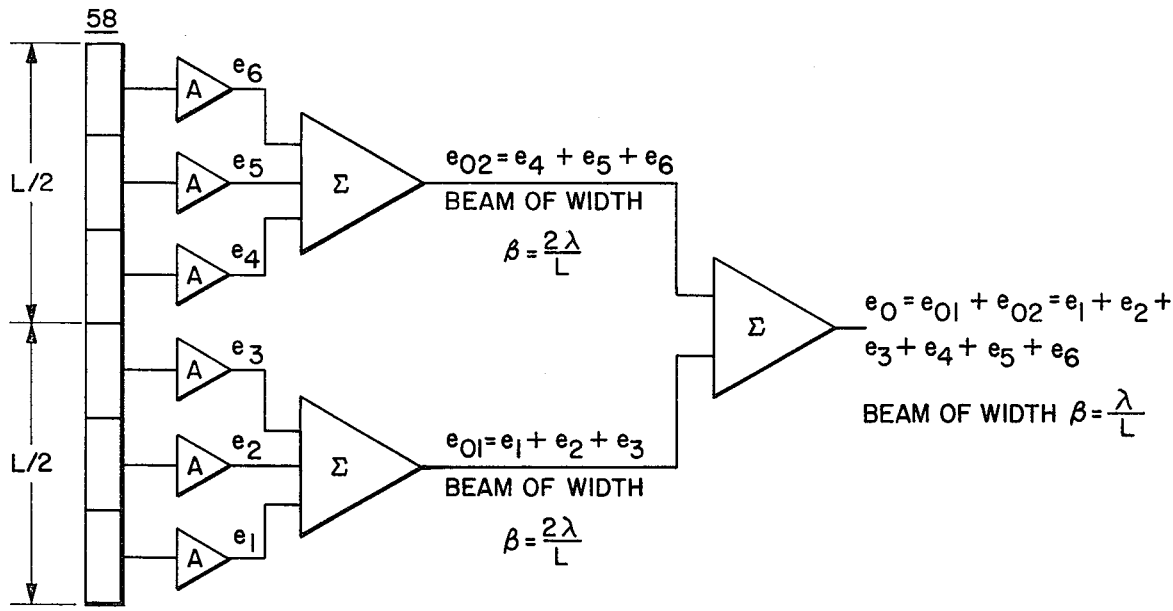

The basic principle involved in the obtaining of a higher resolution beam from the coherent addition of a plurality of beams, is demonstrated with respect to FIGS. 6A and 6B.

In FIG. 6A the segments of transducer 58 each provide a segment output signal. The respective amplifier output signals $e_1$ to $e_6$ are added together in summer Σ resulting in a beam signal $e_0 = e_1 + e_2 + e_3 + e_4 + e_5 + e_6$, with the width $\beta$ of the beam being approximately equal to $\lambda/L$ radians, where $\lambda$ is the operating wavelength and L the transducer length.

If the array were split in two, as in FIG. 6B, the beam formed from each half ($e_{01} = e_1 + e_2 + e_3$ and $e_{02} = e_4 + e_5 + e_6$) would have a beam width of approximately $\lambda/(L/2)$ or $2\lambda/L$, that is, twice the width of the beam in FIG. 6A. If these two signals $e_{01}$ and $e_{02}$ are added together the output is the same as the output of FIG. 6A and would therefore result in a beam width of $\beta = \lambda/L$. If just three segments are used to obtain $e_{01}$ on one ping and those same three elements moved to obtain $e_{02}$ on a next ping it is possible by storing the beam signal $e_{02}$, to reconstruct the output $e_0$ by coherently adding the two derived signals $e_{01}$ and $e_{02}$, thereby resulting in a beam of higher resolution than could normally be obtained by just the three segment transducer.

Figure 7:
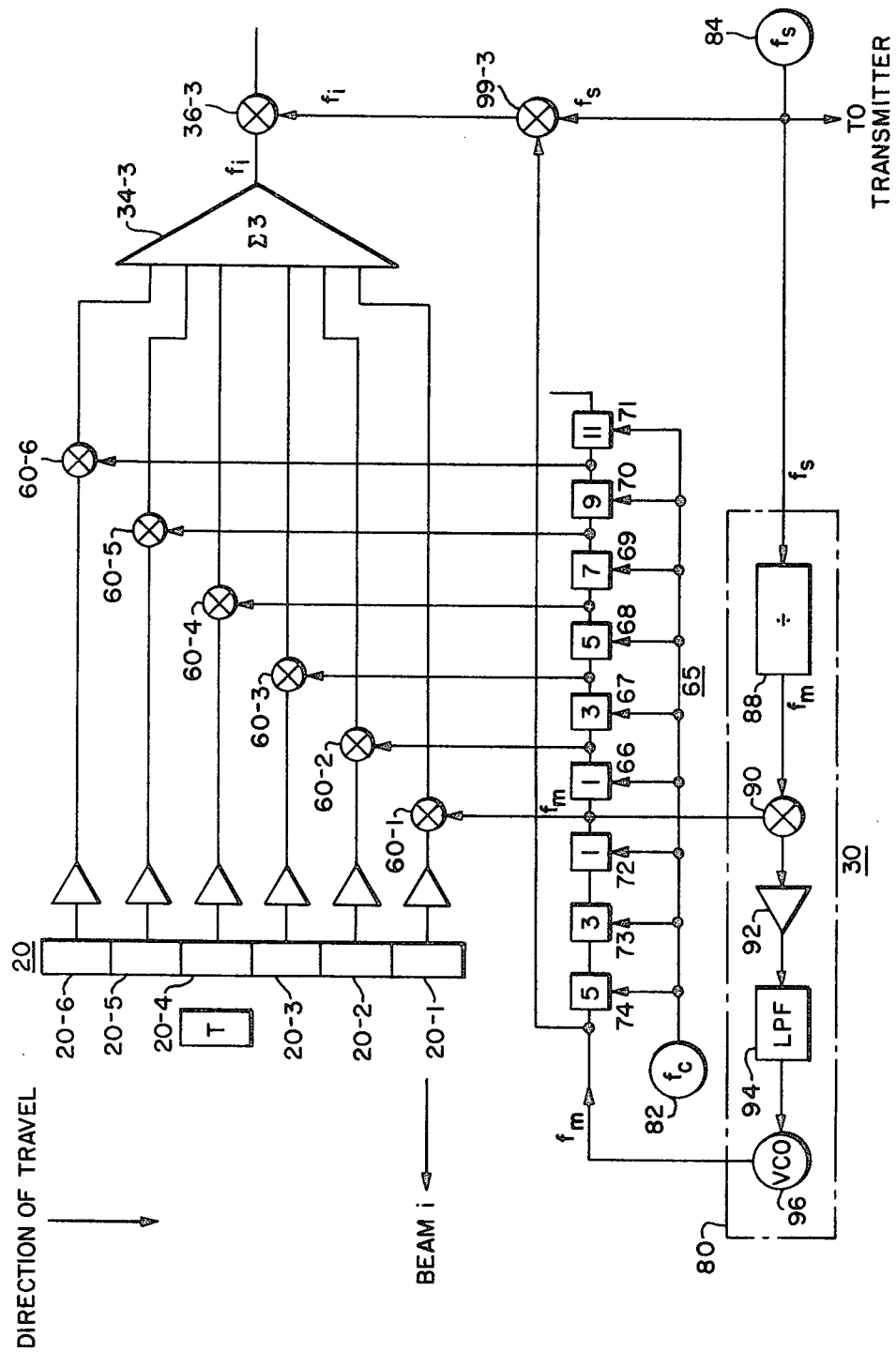
FIGS. 7, 8 and 9 illustrate the beam formers 3, 6 and 9 of FIG. 2 in more detail.
Figure 8:
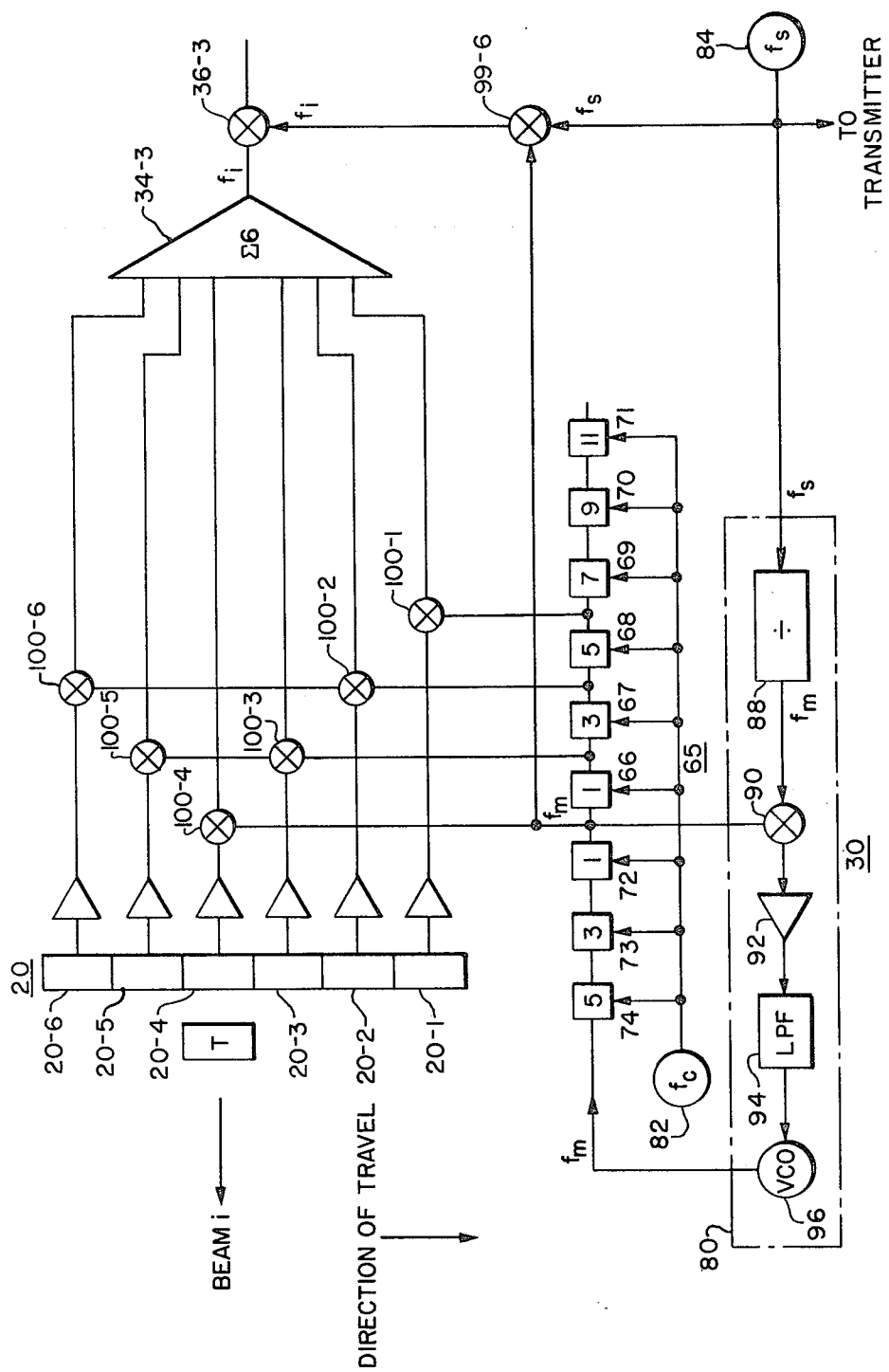
Figure 9:
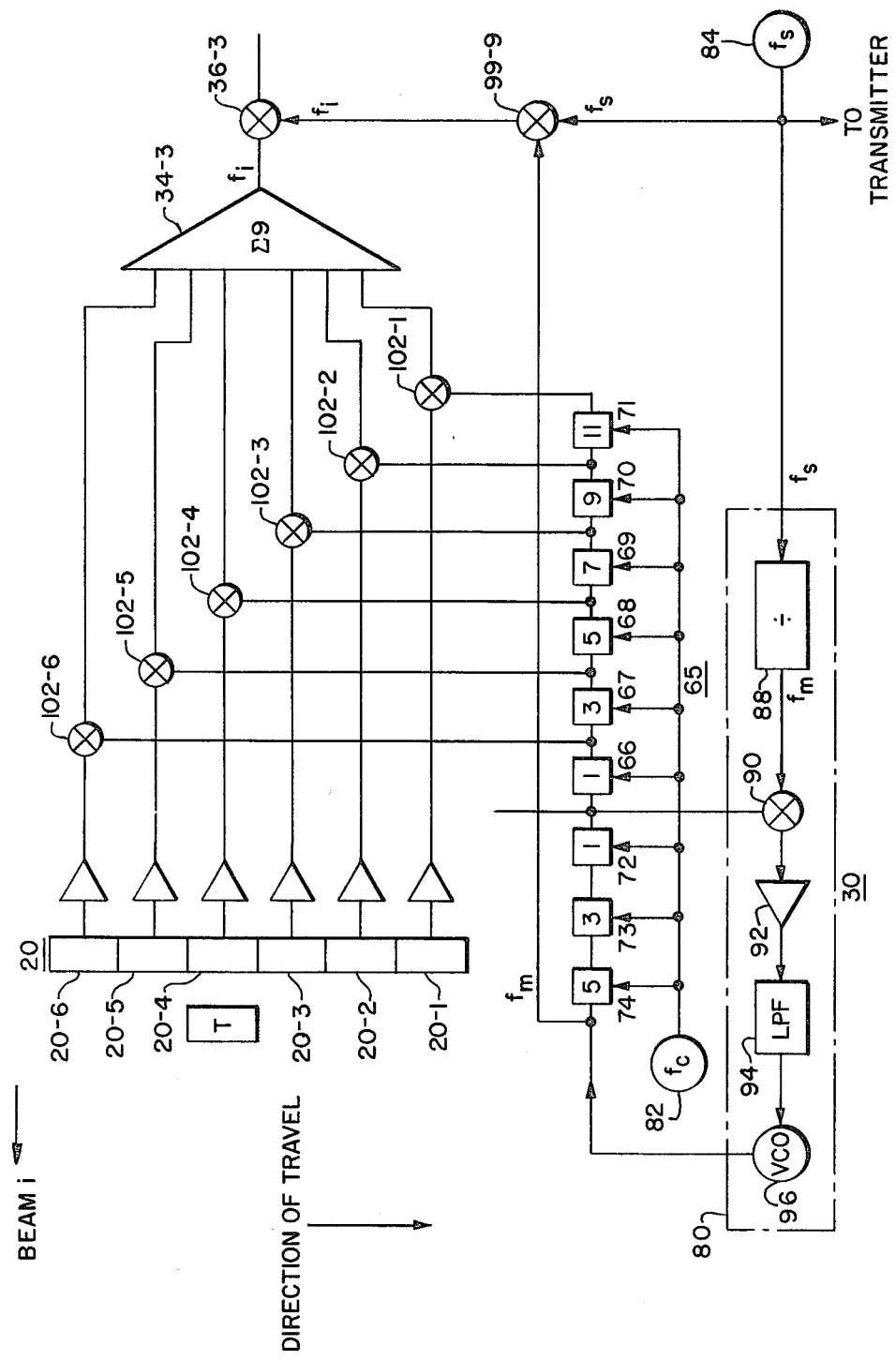

FIGS. 7, 8 and 9 illustrate respective beam formers 3, 6 and 9 (one from each group of three) together with the signal generator circuit 30 slightly modified from that illustrated in the aforementioned patent, in order to achieve a dual capability of operation in both the real and synthetic aperture modes. For illustrative purposes, a synthetic aperture beam $i$ is shown relative to the moving receiver transducer 20 on three successive pings, ping 1 being illustrated in FIG. 7, ping 2 in FIG. 8 and ping 3 in FIG. 9. For forming beam 3, as illustrated in FIG. 7, the outputs of the transducer segments 20-1 to 20-6 are provided to respective mixers 60-1 to 60-6 each of which additionally receives an input signal from signal generator 30 for shifting the phase of the segment signals relative to a reference segment, 20-1, to cancel any relative phase difference between them, with the shifting of phase being varied with time.

The signal generator 30 may be similar to that described in the aforementioned patent in the inclusion of a delay line such as digital shift register 65 having a first plurality of tapped stages 66 to 71. For operation in the synthetic aperture mode, the transmitter location relative to a particular beam location changes from ping-to-ping. Accordingly, in order to compensate for the varying transmitter location relative to a beam there is provided a second plurality of tapped stages 72 to 74 with the tap between stages 66 and 72 constituting a reference phase. A mixing signal $f_m$ provided by generator 80 is propagated down the shift register as governed by a control frequency generator 82 providing a clocking signal $f_c$ having a frequency which varies with time. The mixing signal $f_m$ is phase shifted or delayed by a certain number of units with the units of phase shift for each stage being indicated within each block of the shift register.

For coherent addition of signals, phase information must be accurately preserved and controlled and in the present invention the mixing signal $f_m$ is derived from a signal generator 84 which provides the basic sonar signal $f_s$. $f_s$ is divided down in divider circuit 88 by a predetermined factor to obtain $f_m$ which is nominally correct and which then enters a phase locked loop including mixer 90, amplifier 92, low pass filter 94 and a voltage controlled oscillator 96. A second input signal to mixer 90 is a signal $f_m$ derived from the reference phase tap between stages 66 and 72. If there is any difference between the two input $f_m$ signals to mixer 90 an error signal will be generated to vary the frequency and phase of voltage controlled oscillator 96 to lock it to the mixing frequency. Since a plurality of different signals are provided by mixer 90, a low pass filter 94 is provided in circuit to pass only the DC component thereof for control purposes. When the frequency and phase of voltage controlled oscillator are stabilized and correct, no control signal will be generated by mixer 90.

Relative to the reference phase, the signal $f_m$ propagating down the shift register is progressively delayed in stages 66 through 71 whereas the signal is progressively advanced in phase in stages 72 to 74. The amount of phase advancement is dependent upon how far away the synthetic aperture beam (beam $i$) is from a reference (the transmitter location). For the situation depicted in FIG. 7, a signal $f_m$ is obtained from a point nine units of phase advanced from the reference phase and is provided to a mixer 99-3 which also receives the basic sonar frequency $f_s$ to provide an output to synchronous demodulator 36-3. The two demodulator inputs therefore are two intermediate frequency (IF) signals, one being provided by summer 34-3 which has a certain phase associated with the receiver, and the other being provided by mixer 99-3 and is a reference IF signal having a certain phase associated with the transmitter position.

FIG. 8 illustrates the components and connections for beam former 6 and includes a plurality of mixers 100-1 to 100-6 which receive the mixing signal $f_m$, delayed by predetermined amounts, from signal generator 30, with the reference phase being applied to mixer 100-4. Since beam $i$ is directly in line with the transmitter T, mixer 99-6 receives signal $f_m$ from the reference position without any advancement in phase. In FIG. 9 mixers 102-1 to 102-6 form beam number 9 (formed beyond the segment 20-6) and since beam $i$ is three segments away from transmitter T, the signal $f_m$ applied to mixer 99-9 is advanced in phase by nine units.

Figure 10:
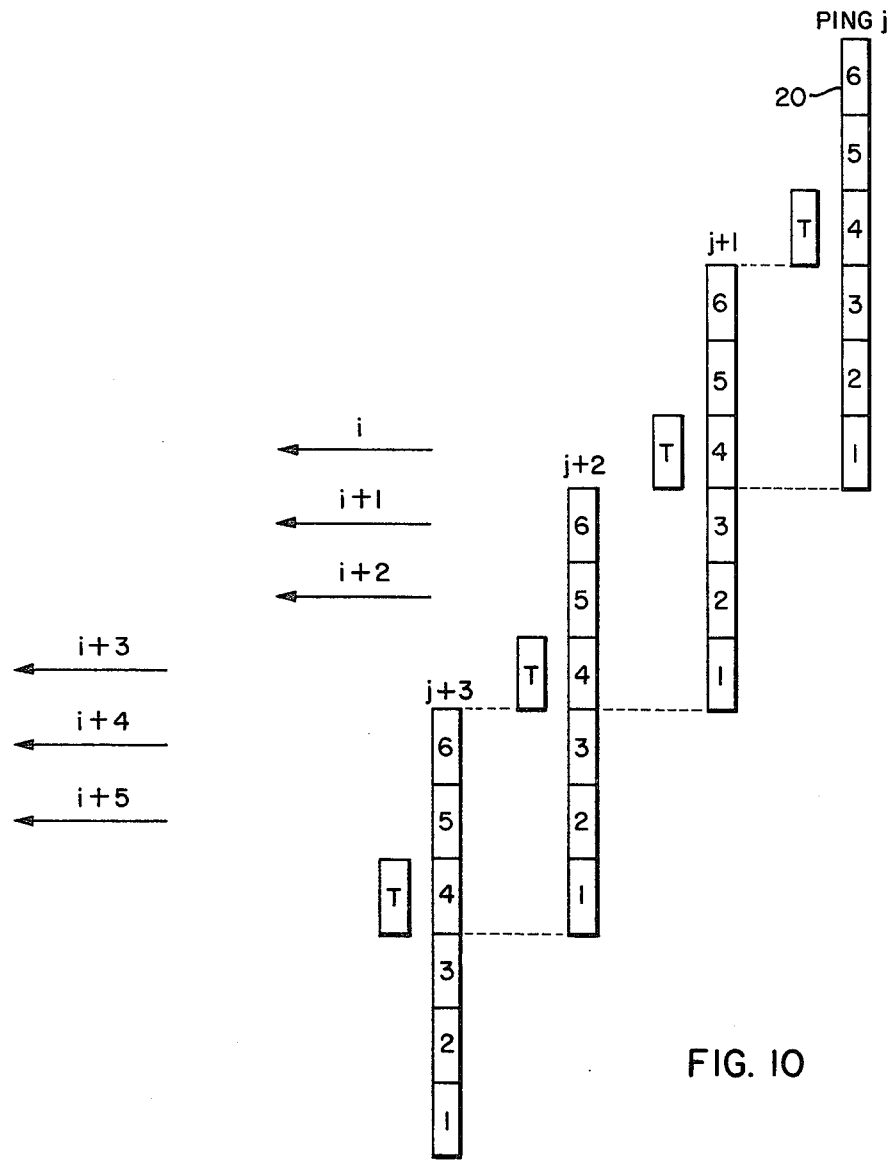
FIG. 10 illustrates the side-looking sonar receiver-transducer in various positions in the course of its travel.

FIG. 10 illustrates the transducer arrangement as it progresses along its course of travel for four successive pings $j$ to $j + 3$. Although the transducer travels along the same straight line, the ping positions have been offset for clarity so as not to overlap one another. It is seen that on ping $j$ the beam $i$ is formed opposite transducer segment 20-1 as in FIG. 7. On the next ping $j + 1$ it is opposite the transmitter and receiver transducer segment 20-4 and on the following ping $j + 2$ it is one element beyond the end of transducer segment 20-6. For each ping position nine real beams are formed and after the first three ping positions three synthetic aperture beams are formed, $i$, $i+1$ and $i+2$. However, the results of ping positions $j + 1$, $j + 2$ and $j + 3$ will provide a next set of synthetic aperture beams $i+3$ to $i+5$ with a succeeding set of synthetic aperture beams being formed as a result of ping positions $j + 2$ to $j + 4$, etc.

Accordingly, there has been provided a side-looking sonar system which is operative not only in a normal real aperture mode but can be immediately placed into a synthetic aperture mode for high resolution search work. The number of transducer segments, the number of real beams formed, and the number of synthetic aperture beams formed have been illustrated simply by way of example and in actual construction the number of transducer segments would in all probability be greater than six in order to reduce unwanted side lobes in the receiver beams.

I claim:

1. Side-looking sonar apparatus, comprising:
   a. first means for obtaining a plurality of real aperture beam signals;
   b. second means including said first means for obtaining a plurality of synthetic aperture beam signals; and
   c. means for selectively displaying said signals.

2. Synthetic aperture sonar apparatus comprising:
   a. an elongated side-looking sonar transducer made up of a plurality of segments, each providing a respective segment output signal in response to reflected acoustic energy from a target area sonified by repetitive acoustic transmissions during travel over said target area;
   b. circuit means responsive to said segment output signals for forming a predetermined plurality of beam signals;
   c. means for storing said beam signals; and
   d. means for coherently adding newly formed and previously stored beam signals.

3. Synthetic aperture sonar apparatus comprising:
   a. an elongated side-looking sonar transducer made up of a plurality of segments each providing a respective segment output signal in response to reflected acoustic energy from a target area sonified by repetitive acoustic transmissions during travel over said target area;
   b. a plurality of beam signal processing channels responsive to said segment output signals for providing a plurality of beam display signals;
   c. each said channel including
      i. circuit means for obtaining a beam signal;
      ii. storage means for storing said beam signals;
   d. a selected number of said storage means being operable to transfer their contents, from one transmission, to the storage means of selected other said channels, on a subsequent transmission;
   e. a selected number of said channels including means for adding the contents of their respective storage means to the transferred contents received from said selected number of storage means.

4. Apparatus according to claim 3 which includes:
   a. means for selectively displaying said beam signals or said stored and added beam signals.

5. Apparatus according to claim 3 which includes:

a. signal generator means operable to supply a plurality of mixing signals of predetermined relative phases, to each said channel for mixing with said segment output signals.

6. Apparatus according to claim 5 wherein said circuit means in each said channel includes:
   a. a plurality of mixers each responsive to a respective segment output signal and mixing signal from said signal generator to provide respective mixer output signals;
   b. summing means for summing said mixer output signals;
   c. demodulator means for demodulating said summed signal from said summing means to provide a beam signal.

7. Apparatus according to claim 6 wherein:
   a. said demodulator means is a synchronous demodulator; and wherein
   b. said signal generator provides a mixing signal of predetermined phase, to said synchronous demodulator.

8. Apparatus according to claim 6 wherein said signal generator includes:
   a. means for generating a mixing signal $f_m$;
   b. delay line means for propagating said mixing signal $f_m$ and having a plurality of tapped stages, the phase of an output signal from an intermediate stage thereof constituting a reference phase;
   c. means for applying said mixing signal $f_m$ delayed in phase relative to said reference, to the mixers of said channels; and
   d. means for applying said mixing signal $f_m$ advanced in phase relative to said reference, to said demodulator means of said channels.

9. Apparatus according to claim 8 which includes:
   a. a signal generator for providing a basic sonar signal $f_s$;
   b. a plurality of mixers responsive to said sonar signal $f_s$ and respective ones of said advanced in phase mixing signals to provide resultant IF signals to said demodulator means of said channels.

10. Apparatus according to claim 9 wherein:
    a. at least one of said mixers which receives said sonar signal also receives said reference phase output signal.

11. Apparatus according to claim 9 wherein:
    a. $f_s$ is an exact multiple of $f_m$.

12. Apparatus according to claim 8 wherein said means for generating a mixing signal $f_m$ includes:
    a. means for providing a nominally correct $f_m$ signal; and
    b. a phase locked loop having as one input said nominally correct $f_m$ signal and as a second input, said reference phase output signal from said delay line means to maintain and stabilize the frequency and phase of said mixing signal $f_m$.

13. Apparatus according to claim 8 wherein:
    a. said delay line means is a digital shift register having a plurality of tapped stages; and which includes
    b. a source of control signal $f_c$ operable to clock the stages of said shift register to transmit the mixing signal $f_m$ down said shift register, the frequency of said control signal $f_c$ being variable as a function of time.

* * * * *